US008583499B2

(12) United States Patent
De Judicibus et al.

(10) Patent No.: US 8,583,499 B2
(45) Date of Patent: Nov. 12, 2013

(54) SYSTEM FOR SECURED TRANSACTIONS OVER A WIRELESS NETWORK

(75) Inventors: Dario De Judicibus, Rome (IT); Sandro Leopardi, Rome (IT); Leonardo Modeo, Rome (IT); Nicola Pergola, Rome (IT)

(73) Assignee: Toshiba Global Commerce Solutions Holding Corporation, Shinagawa-ku, Tokyo ( * ) Notice: Subject to any disclaimer, the term of this patent is extended or adjusted under 35 U.S.C. 154(b) by 0 days.

(21) Appl. No.: 13/461,128

(22) Filed: May 1, 2012

(65) Prior Publication Data
US 2012/0215649 A1    Aug. 23, 2012

Related U.S. Application Data

(62) Division of application No. 10/676,346, filed on Sep. 29, 2003, now Pat. No. 8,352,360.

(30) Foreign Application Priority Data

Jun. 30, 2003    (EP) .................................... 03368065

(51) Int. Cl.
G06G 1/12    (2006.01)
(52) U.S. Cl.
USPC ................... 705/21; 705/16; 705/39; 705/44; 705/75; 705/5; 705/17; 705/18; 705/40; 455/406; 455/408; 455/411
(58) Field of Classification Search
None
See application file for complete search history.

(56) References Cited

U.S. PATENT DOCUMENTS

| 2002/0120585 | A1 | 8/2002 | Talker |
| 2003/0119478 | A1 | 6/2003 | Nagy et al. |
| 2003/0187795 | A1 | 10/2003 | Lee et al. |
| 2004/0267618 | A1 | 12/2004 | De Judicibus et al. |
| 2007/0027803 | A1 | 2/2007 | Brandes et al. |

FOREIGN PATENT DOCUMENTS

| WO | 96/13814 | 5/1996 |
| WO | 97/45814 | 12/1997 |

OTHER PUBLICATIONS

Anonymous. Computer Reseller News: Roundup of recent testing. Computer Reseller News 608 (Dec. 5, 1994): 106.*
Office Action (Mail Date Sep. 23, 2008) U.S. Appl. No. 10/676,346, filed Sep. 29, 2003; Confirmation No. 7141.

(Continued)

Primary Examiner — Ryan Zeender
Assistant Examiner — Fawaad Haider
(74) Attorney, Agent, or Firm — Schmeiser, Olsen & Watts, LLP

(57) ABSTRACT

A system for implementing a method that books and pays a retailer having a POS connected to a transaction server storing confidential user information including a retailer identification, a user code, and a user wireless device phone number. The method includes: receiving at the transaction server, from the user wireless device which can be a cell phone, an SMS containing a retailer identification; reading at the transaction server the phone number of the wireless device communicated by the carrier transporting the SMS; authentifying the phone number and retailer identification with the stored confidential user information; sending the user confidential information to the retailer POS. The user enters on the POS the user code. The POS reads and authentifies the user code with the user confidential information received from the transaction server. The retailer enters the payment information on the POS and sends it with user information to the transaction server.

5 Claims, 4 Drawing Sheets

(56) References Cited

OTHER PUBLICATIONS

Amendment filed Dec. 23, 2008 in response to Office Action (Mail Date Sep. 23, 2008) for U.S. Appl. No. 10/676,346, filed Sep. 29, 2003; Confirmation No. 7141.
Final Office Action (Mail Date Mar. 5, 2009) for U.S. Appl. No. 10/676,346, filed Sep. 29, 2003; Confirmation No. 7141.
Amendment filed May 4, 2009 in response to Final Office Action (Mail Date Mar. 5, 2009) for U.S. Appl. No. 10/676,346, filed Sep. 29, 2003; Confirmation No. 7141.
Advisory Action (Mail Date Jun. 1, 2009) for U.S. Appl. No. 10/676,346, filed Sep. 29, 2003; Confirmation No. 7141.
Request for Continued Examination and Amendment filed Jun. 5, 2009 in response to Advisory Action (Mail Date Jun. 1, 2009) for U.S. Appl. No. 10/676,346, filed Sep. 29, 2003; Confirmation No. 7141.
Office Action (Mail Date Sep. 9, 2009) for U.S. Appl. No. 10/676,346, filed Sep. 29, 2003; Confirmation No. 7141.
Amendment filed Dec. 2, 2009 in response to Office Action (Mail Date Sep. 2, 2009) for U.S. Appl. No. 10/676,346, filed Sep. 29, 2003; Confirmation No. 7141.
Final Office Action (Mail Date Mar. 2, 2010) for U.S. Appl. No. 10/676,346, filed Sep. 29, 2003; Confirmation No. 7141.
Amendment filed May 3, 2010 in response to Final Office Action (Mail Date Mar. 2, 2010) for U.S. Appl. No. 10/676,346, filed Sep. 29, 2003; Confirmation No. 7141.
Advisory Action (Mail Date May 14, 2010) for U.S. Appl. No. 10/676,346, filed Sep. 29, 2003; Confirmation No. 7141.
Request for Continued Examination filed Jun. 2, 2010 in response to Advisory Action (Mail Date May 14, 2010) for U.S. Appl. No. 10/676,346, filed Sep. 29, 2003; Confirmation No. 7141.

\* cited by examiner

US 8,583,499 B2

SYSTEM FOR SECURED TRANSACTIONS OVER A WIRELESS NETWORK

This application is a divisional application claiming priority to Ser. No. 10/676,346, filed Sep. 29, 2003, now U.S. Pat. No. 8,352,360, issued Jan. 8, 2013.

FIELD OF INVENTION

The present invention generally relates to a method and system for performing secured transactions for services provided at different locations and supported by an application server; more particularly, the present invention applies to transactions for booking and paying services when the customer uses a common wireless device and the retailer a simple computer.

BACKGROUND OF INVENTION

Business transactions such as payment transactions performed over wireless networks need to be secured. This implies identification of the device connecting for the transactions and of the device user, author of the transaction.

For wireless device identification, when a SMS message is sent, the phone number is identified and a server can associate the message with information already stored. The authentication may consist in validating that the phone number is a phone number corresponding to an existing and authorized user. This authentication validates the device itself but does not validate the user of the device. That is why an additional identification of the user is required to be entered by the user and sent for verification to the application servers.

Some sample solutions exist today for performing payment over wireless networks with the use of a wireless payment terminal using Short Messaging Service (SMS) messaging over a GSM like wireless network. In the International Applications under the PCT WO 9613814 published on May 9, 1996 and WO 9745814 published on Dec. 4, 1997, the user, through a dedicated wireless payment terminal, performs payment or balance information transactions towards a bank computing station. The identification is performed by the user at the time of transaction and the identification is confirmed (authenticated) by the network service provider or the computing station which confirms that the information transferred by SMS belongs to an authorized subscriber.

If the banks and some retailers may invest in dedicated payment terminals, there is a need also to provide on existing common customer and retailer equipment, a way to perform payments with secure identification. The common communication equipment owned by a customer is the mobile phone and the equipment owned by the retailer is an independent computer or, more frequently, a POS or POE thin user computer system such as a palm, pocket PC or similar. This later device at the retailer location has programming capabilities and uses wired or wireless communication to an application server which processes the usual retailer's transactions. The application server may itself communicate with other banking services for the retailer final banking operations.

It is in the business activity requiring a first step of booking a service such as taxi or restaurant reservation, that there is a need today to provide a secure method of booking and payment even when the customer and retailer have standard equipment. It would be of a great interest to provide security over the use of common communication and processing equipment such as a mobile phone for the customer and a standard thin user PC at the location of the retailer selling services to the customer.

SUMMARY OF THE INVENTION

It is therefore an object of the present invention to provide a method to perform secured transactions for booking and paying a service using standard wireless devices and computers.

It is yet another object of the present invention to provide a solution easy to implement when the retailer providing the service uses an application server to support the transactions performed on its computer.

These object are achieved in accordance with one embodiment of the present invention wherein there is provided a method for booking and paying a retailer having a POS connected to a transaction server storing confidential user information including a retailer identification, a user code and a user wireless device phone number, said method comprising the steps of receiving at the transaction server, from the user wireless device an SMS containing a retailer identification, reading at the transaction server the phone number of the wireless device communicated by the carrier transporting the SMS, authentifying said phone number and retailer identification with the stored confidential user information and sending the user confidential information to the retailer POS, the user entering on the POS the user code and the POS reading and authentifying the user code with the user confidential information received from the transaction server, the retailer entering the payment information on the POS and sending it with user information to the transaction server.

The objects are also achieved in accordance with another embodiment of the present invention wherein there is provided a system for booking and paying a retailer in a secure way, said system comprising a user wireless device sending a digital message through a wireless network, said message containing identification for a retailer through a wireless network, a server receiving said digital message and authentifying the user phone number and retailer with user confidential data stored on said server and sending said user confidential data to said retailer POS, a POS receiving user confidential data and authentifying data entered on it by the user with said received user confidential data and sending user payment transaction data to said server.

The solution of the present invention particularly applies to retailers providing services with booking to customers; this is the case for restaurants, taxi cabs, shows and other events. As it is simple to implement because the customer may use his standard mobile phone and the retailer providing the service only require to have simple computer equipment wherein an application program is executed. As there is no need of specialized booking or payment dedicated terminal, this solution is accessible to small business and widely spread retailing sites of a town.

One other advantage of the solution is that it is independent from the payment system. Once transactions are collected by the system, retailers can choose to integrate the system with credit card system for customer billing, or direct bank account, or even by cash, on a monthly basis, if they prefer so.

One other advantage of the solution is that it is independent both from the GSM Mobile Operator and from the GSM equipment manufacturer. Any user with a basic, GSM-compatible terminal, and service contract with a GSM Mobile Operator can interact correctly with the system.

The system is server-centered, so one of the advantages of the solution is that during the transaction process, the user's identification data (e.g. Personal Identification Number (PIN)) are protected with security levels that can be made higher at will, with no need for additional functionalities on the end-user's GSM terminal.

DETAILED DESCRIPTION OF THE PREFERRED EMBODIMENT

Figure 1:
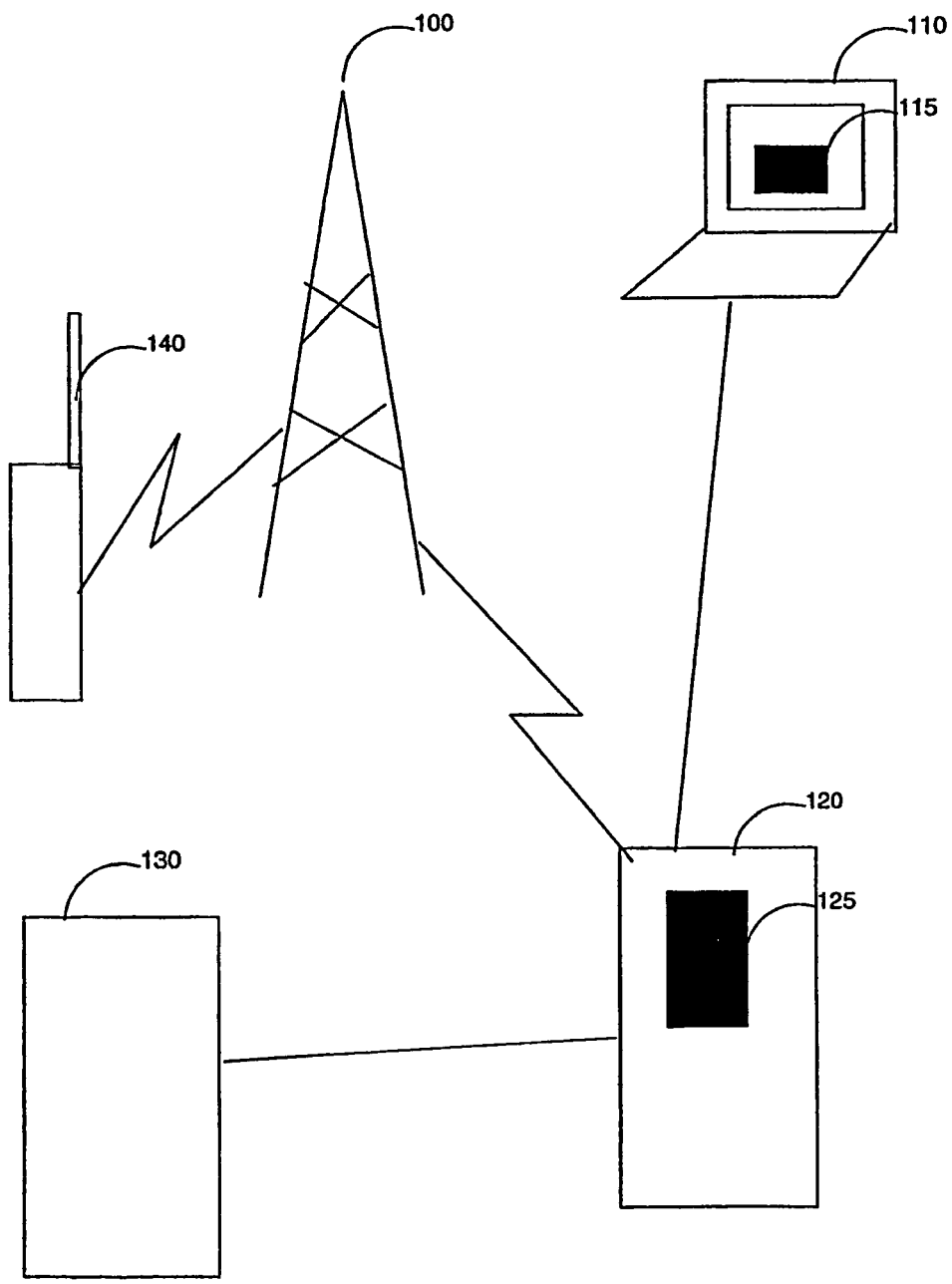
FIG. 1 illustrates the overview of the system for operating secure transactions according to the preferred embodiment of the invention.

FIG. 1. illustrates the system containing the preferred embodiment of the invention. The wireless network (100) used may be a GSM network. One retailer site which may be a restaurant, a taxi or a boot for selling theater or transportation tickets has a workstation (110), which could be a palm or any thin user PC, has connectivity equipment to an application server (120). The connection of the workstation (110) to the application server (120) may be of any kind but is secure, the connection is usually imposed by the owner of the application server, if the owner is not the retailer himself as it is the case for small business. This workstation is a Point of Sale or Point of Entry (POS/POE) for the application server (120). This implies that the server (120) provides support for transactions to all the retailer company POS/POE (110) connected to it. Also, the application server may be in charge of performing other transactions on behalf of the retailers with banking servers (130), for instance through any other kind of network which is secure. As described in detail in reference with the following figures, according to the preferred embodiment, the server (120) is able to perform registrations and reservations for a customer of retailer services. The customer sends SMS messages to the server (120) from his standard mobile phone (140). According to the preferred embodiment, the server (120) can execute a program (125) able to process the SMS messages from the customer mobile phone and performs the customer registration steps of the method. The program (125) allows also communication with the POS/POE (110) for customer identification. In the preferred embodiment, the POS/POE can execute a program (115) performing customer identification and exchanging information with the server for customer identification and request for payment transaction. It is noted that the preferred embodiment of the invention can be implemented by modifying existing POS/POE programs and existing transaction server.

Figure 2:
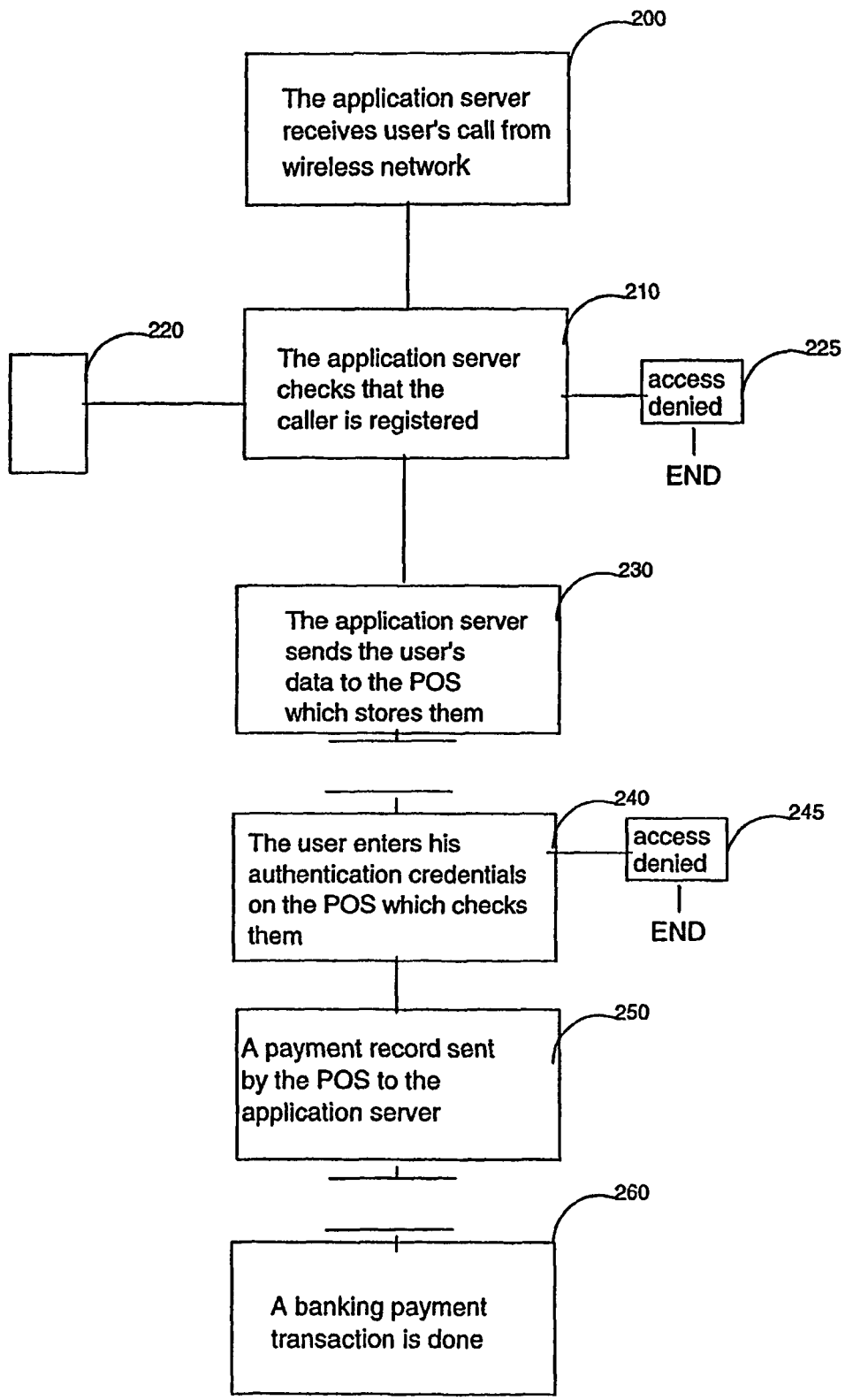
FIG. 2 is the general flowchart of the method according to the preferred embodiment.

FIG. 2 is the general flow chart of the booking and payment process a customer performs to buy goods or services from a retailer according to the preferred embodiment. It is noted that only the customers having already subscribed to this kind of booking/payment service can perform this method. The initial step for a customer of registering himself is described later in the document in reference to FIG. 3. It is noted also that, even if in the preferred embodiment the retailer application server implementing the booking/payment method is dedicated to one retailer, the method and system of the invention can be used by a group of retailers, in one city for instance, commonly providing this secure booking/payment and sharing the services of a same application server service provider in support of their transactions. The process of booking and paying goods or services comprises six main steps. The first step (200) is performed by a customer who, in any location including his home or a retailer location, has, for instance a mobile phone connected to the Mobile GSM Network (100), and manifests his/her intention to book for some goods or services from the retailer. He/She (140) sends an SMS messages to the main application server (120). In the second step (210), the main server (120) receives the SMS messages from Mobile GSM Network (100) and, using the information provided in the call, verifies caller's authorization to the service, according to some specific user's service profiling data already stored in the computer (220). At this stage the main server (120) decides whether the user (140) can or cannot continue his/her transaction. If the caller is not known from the server as a registered customer, the server denies access to the service and ends the communication (225). The process continues to the third step if (and only if) the user (140) is permitted to continue on his/her way to book for the goods or services he/she needs. The main server (120) sends (230) user's related data (credentials, PIN, profiling etc . . . ) to the service provider's POS/POE thin client (110) in order to prepare at the retailer location the payment transaction. The information is stored in the POS. In the fourth step the user is approaching the service provider's location (the restaurant, the taxi cab . . . ). He/She goes by the POS/POE thin client and is required (240) to enter his/her authentication credentials. The POS/POE (110) is capable to match the information the user enters against the credentials received during the preceding step (230) from the server. The access to the payment transaction is refused (245) to the user and the process stopped if the user's authentication credentials is not recognized by the POS. The process continues to the next step (250) if (and only if) the user is authenticated. The authenticated user can get the requested good or service. In the following step (250), the main server (120) is updated from POS/POE thin client (110) with the fee the authenticated user has to pay to the service provider for the services or goods he/she just received.

In a following step of FIG. 2 (260), a financial settlement transaction occurs between the main server (120) and the banking server (130). This step is optional and is not essential to the secure booking/payment method of the preferred embodiment. As a matter of fact, according to the service usage agreement between the customers and the service provider, financial settlement can even occur on a monthly basis, not necessarily on a per-transaction basis. This can be useful when the average value of the user's transactions is relatively small. The service usage agreement between the customer and the service provider may imply any kind of payment system (direct banking account, credit card, prepaid account etc . . . ).

Figure 3A:
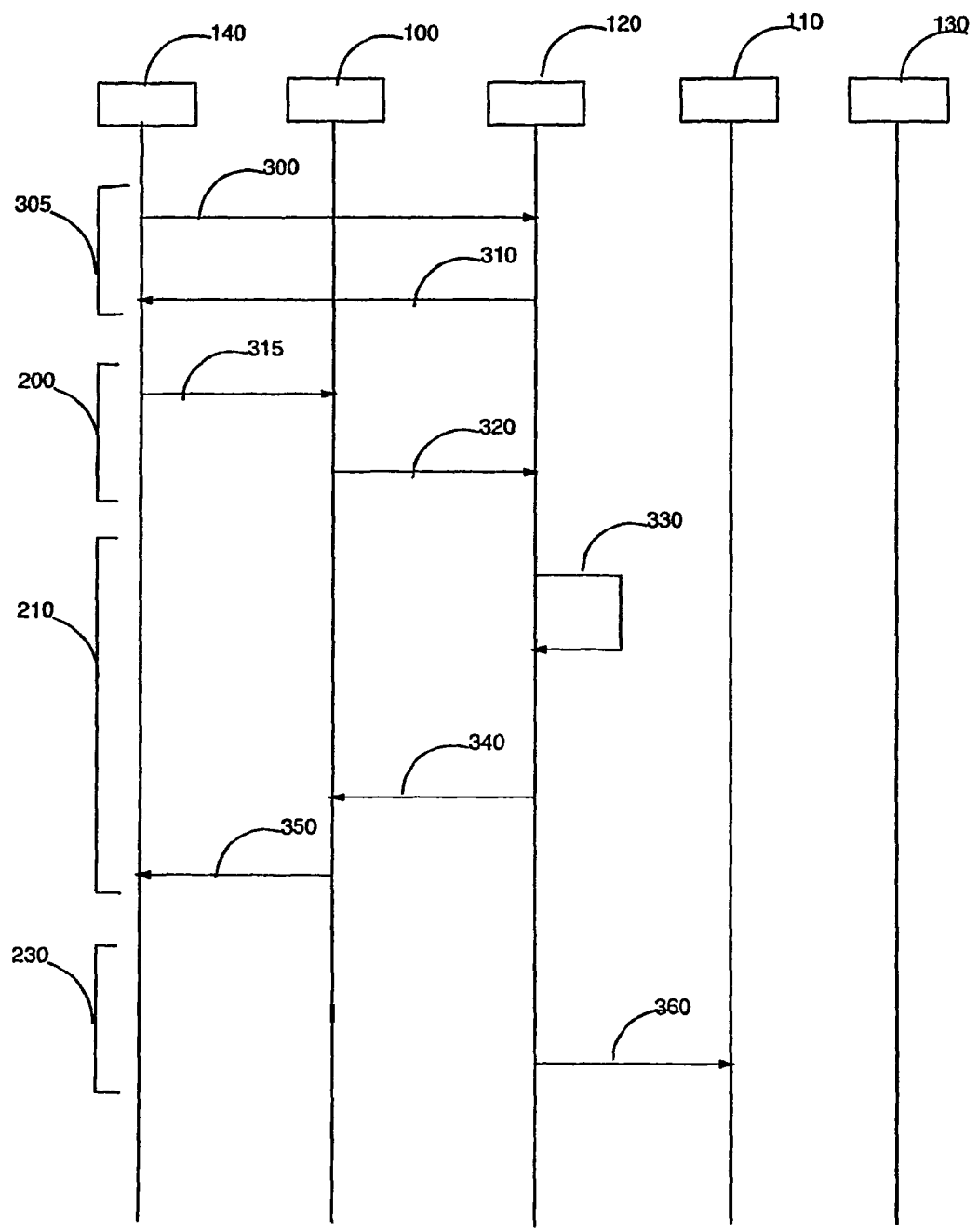
FIG. 3A, 3B is a detailed flow chart of the preferred embodiment.
Figure 3B:
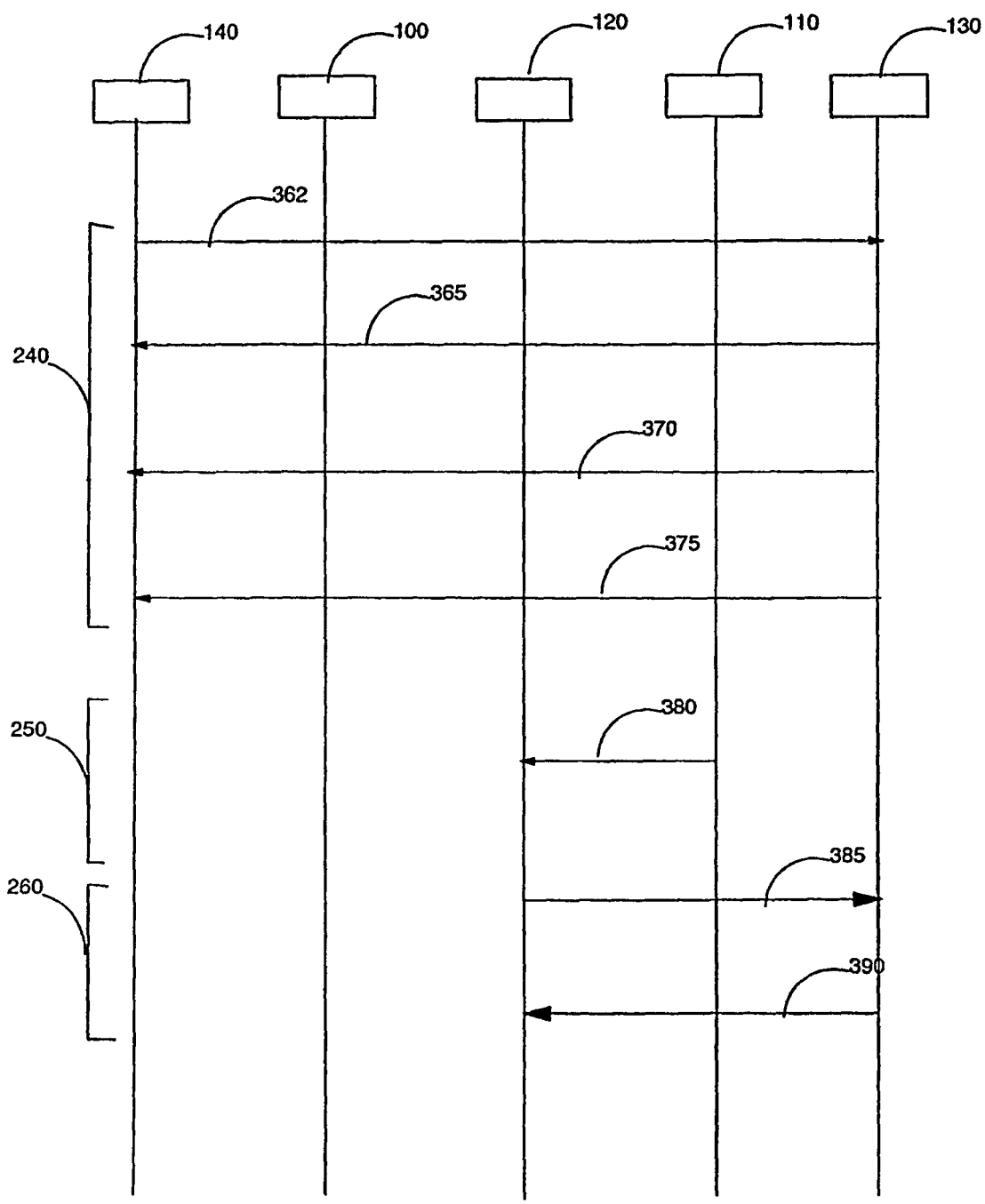

FIG. 3 (3A,3B) describes in more details the steps of the general flow chart of method according to the preferred embodiment. In FIG. 3 are shown the messages exchanged between the different components of the system (140, 100, 120, 110, 130). To operate the method of the preferred embodiment, an initial step (305) is performed by the customer to register himself to the main server (120) before using the service of secure booking/payment operations according to the preferred embodiment. This is relevant in that the customer must provide all the information the system needs for proper working. In particular, for the sake of security, it is mandatory to provide the following information: cellphone, user identification string, PIN and preferred payment system (credit card, or bank account and the like . . . ). This initial registration step (305) can be performed by the customer by phone, talking with an operator or by mail. The information are stored on the main server (300). By return the customer receives a mail or by phone from an operator a confirmation that the registration is done on the main server (310) and that he can start using the secure booking/payment service. A user identification is provided to this new customer as well as his balance summary, the maximum number of allowed transactions and any other useful information to start using this service. The step of booking by calling on a mobile phone (200) is performed by the customer keying in and sending (315) an SMS string containing a service identification number through the wireless network, for instance a GSM network (100). The format of the SMS the user has to send to the system during this registration step (305) is just an alphanumeric string, whose formatting rules and length are defined by the service provider, and have to be known to the service users. By this alphanumeric string, the service provider uniquely identifies the (several) POS/POE that are enabled for the service. Note that the user is not sending over the wireless network any readable sensitive information, nor is he/she keying in any security PIN on his/her cellphone. The SMS for booking is received (320) by a well known service phone number at the main server (120). The checking (210) that the calling customer is registered is performed by the main server (330). An exception handling SMS is sent back (340) by the server to the network carrier in case of service usage denial (because of out of balance or user expired ext . . . ). The network delivers the SMS denial message to the customer (350). Throughout this detailed flowchart of FIG. 3, courtesy SMS messages are sent back to the user, in order to notify the him/her about his/her progressing between the steps. The next step (230) is performed only if the customer has been authenticated and is all set to perform a payment transaction. The server sends (360) a message to the POS subsystem to open wireless payment transaction comprising the user identification string and the user's PIN. The messages exchanged between the server and the POS are following the application communication protocol of the transaction support. The handling of sensitive information (user identification and PIN) is carried out by the main server and can leverage on the computing power of the main system (120) and POS/POE thin client (110) for commercial-grade data encryption. Deciding which encryption algorithm to use for exchanges between the server and the POS is just a matter of computing capabilities on the POS/POE device (110). For example, a secure hashing technique could be used to send hashed PIN and user identification string from main server (120) to POS/POE (110) in the steps of communication between the server and the POS (360), so that a secure hash of the data the user keys in is re-computed by POS/POE (110) and checked against the (hashed) data received from the main server (120). If the two hashed data match, the user and his/her transaction are authenticated. Otherwise, the transaction should be aborted. When the user is authenticated, the Operator at the POS/POE can key in pricing information and ask user confirmation. The user has just to key in his/her PIN to confirm his/her will to pay. When the customer intends to pay for the good and service at the retailer location (240), he first keys in his user identification string on the POS keyboard (362). The POS finds a match towards open transactions. An exception handling message is displayed on the POS screen (365) if no match is found between the user identification and an existing opened transaction. If an opened transaction is found, the retailer keys in the price and the customer is required to key in his PIN (370). If the POS does not match the PIN with the opened transaction information, it displays an exception handling message (375). If the keyed in data are valid, the payment operation is accepted (250), the POS sends (380) information of completed transaction to the server which updates the corresponding transaction record with price date and time. As with the other communication between the server and the POS (360), commercial-grade data encryption techniques may be adopted to guarantee security and consistency for POS/POE updating the main server (120) with the closed transaction data (price, date and time of closed transaction). A further exchange between the main server and a banking server may be performed (260) in the way of a financial settlement transaction request from the main server to the banking server (385) and the answer from the banking server to the main server for settlement confirmation (390). It is noted also that completed transaction information are available for browsing on the main server for service provider and the users. Accounting and billing processes can be performed by reading on the main server the transaction database, according to an agreement between the service provider and the users.

What is claimed is:

1. A system, comprising a transaction server configured to implement, via execution of program instructions on a processor, a method for booking and paying a retailer comprising a Point of Sale (POS) connected to the transaction server, said program instructions stored on a computer readable storage medium, said method comprising:

said transaction server storing a retail identifier that identifies the retailer, a first user telephone number of a wireless device of a user, and confidential user information for implementing a transaction between the retailer and the user, said confidential user information comprising a first user identification identifying the user and a first personal identification number (PIN) pertaining to the user;

after said storing, said transaction server receiving a Short Messaging Service (SMS) message from the wireless device of the user, said SMS message comprising a retailer identification identifying the retailer, said SMS message not including any readable sensitive information;

said transaction server receiving, from a carrier transporting the SMS message to the retailer, a second user telephone number of the wireless device of the user;

in response to said transaction server receiving the SMS message from the wireless device of the user and the second user telephone number from the carrier, said transaction server verifying that the second user telephone number matches the first user telephone number and that the retailer identification matches the retailer identifier;

in response to said verifying, said transaction server sending the first user identification and the first PIN to the POS comprised by the retailer which results in the sent first user identification and first PIN being received by the POS; and after said sending the first user identification and the first PIN to the POS, said transaction server receiving from the retailer payment information comprising a fee required to be paid by the user to the retailer with respect to the transaction, said receiving the payment information occurring in response to:

the user having entered on the POS both a second user identification identifying the user and a second PIN pertaining to the user, and the retailer having confirmed that the second user identification entered by the user matched the first user identification received by the POS from the transaction server and that the second PIN entered by the user matched the first PIN received by the POS from the transaction server.

2. The system of claim 1, said method further comprising:

after said receiving from the retailer payment information, said transaction server communicating with a banking server to perform a financial settlement of the transaction based on the payment information.

3. The system of claim 1, wherein the method further comprises said transaction server encrypting the confidential user information, and wherein said sending the confidential user comprises said transaction server sending the encrypted confidential user information to the POS comprised by the retailer.

4. The system of claim 1, further comprising the POS.

5. The system of claim 2, further comprising the wireless device.

* * * * *